US012081602B1

(12) United States Patent
Gudipati et al.

(10) Patent No.: US 12,081,602 B1
(45) Date of Patent: Sep. 3, 2024

(54) METERING CLIENT-SIDE FEATURES

(71) Applicant: Amazon Technologies, Inc., Seattle, WA (US)

(72) Inventors: Gowthami Gudipati, Seattle, WA (US); Richard Newman, Whitman, WA (US)

(73) Assignee: Amazon Technologies, Inc., Seattle, WA (US)

( * ) Notice: Subject to any disclaimer, the term of this patent is extended or adjusted under 35 U.S.C. 154(b) by 59 days.

(21) Appl. No.: 17/474,503

(22) Filed: Sep. 14, 2021

(51) Int. Cl.
*H04L 65/403* (2022.01)
*H04L 65/611* (2022.01)
*H04L 65/612* (2022.01)
*H04L 65/65* (2022.01)
*H04L 65/70* (2022.01)

(52) U.S. Cl.
CPC .......... *H04L 65/403* (2013.01); *H04L 65/611* (2022.05); *H04L 65/612* (2022.05); *H04L 65/65* (2022.05); *H04L 65/70* (2022.05)

(58) Field of Classification Search
CPC ..... H04L 65/403; H04L 65/70; H04L 65/612; H04L 65/611; H04L 65/65; G06Q 20/02; G06Q 20/06; G06Q 20/0652; G06Q 20/105; G06Q 20/145; G06Q 20/28; G06Q 20/30; G06Q 30/0209
See application file for complete search history.

(56) References Cited

U.S. PATENT DOCUMENTS

| | | | | | |
|---|---|---|---|---|---|
| 5,557,516 | A | * | 9/1996 | Hogan | G06Q 20/108 705/41 |
| 5,861,907 | A | * | 1/1999 | Wada | H04N 7/15 348/E7.083 |
| 6,320,947 | B1 | * | 11/2001 | Joyce | H04M 15/85 379/112.01 |
| 6,694,429 | B1 | * | 2/2004 | Kalmanek, Jr. | H04L 65/80 713/153 |
| 11,374,917 | B2 | * | 6/2022 | Das | H04L 9/3213 |
| 2001/0028705 | A1 | * | 10/2001 | Adams | H04M 15/00 379/144.01 |
| 2003/0026404 | A1 | * | 2/2003 | Joyce | G06Q 20/40 379/144.01 |
| 2003/0069828 | A1 | * | 4/2003 | Blazey | G06Q 10/10 348/E7.083 |

(Continued)

OTHER PUBLICATIONS

Amazon. (Sep. 1, 2020). Amazon Chime pricing. Retrieved Apr. 8, 2023, from https://web.archive.org/web/20200901200710/https://aws.amazon.com/chime/pricing/#remote-free-tier.*

*Primary Examiner* — Boris D Grijalva Lobos
*Assistant Examiner* — Timothy Sowa
(74) *Attorney, Agent, or Firm* — BakerHostetler

(57) ABSTRACT

Implementations for metering features of media conferences on the client-side are described. Initially, a participant joins a media conference. An identifier of a feature and an allotment associated with the feature is then received by the participant. The feature is used during the media conference and the allotment associated with the feature is decremented based on the use of the feature. It is then determined that an allotment refresh is needed. In response, additional allotment associated with the feature is requested and received by the participant until the maximum number of additional allotment requests or the maximum allotment is reached.

20 Claims, 8 Drawing Sheets

(56) References Cited

U.S. PATENT DOCUMENTS

| | | | | |
|---|---|---|---|---|
| 2009/0113316 | A1* | 4/2009 | Palermo | H04N 7/147 |
| | | | | 715/758 |
| 2010/0015945 | A1* | 1/2010 | Shuman | H04M 15/8077 |
| | | | | 455/406 |
| 2010/0316046 | A1* | 12/2010 | Kalmanek, Jr. | H04L 65/80 |
| | | | | 370/352 |
| 2012/0022902 | A1* | 1/2012 | Gressel | G07C 9/27 |
| | | | | 235/382 |
| 2015/0271538 | A1* | 9/2015 | Yang | H04N 21/25816 |
| | | | | 725/4 |
| 2015/0381824 | A1* | 12/2015 | Ting | H04M 17/201 |
| | | | | 370/338 |
| 2017/0061397 | A1* | 3/2017 | Lee | G06Q 20/36 |
| 2017/0149704 | A1* | 5/2017 | Batiz | H04L 51/046 |
| 2018/0004479 | A1* | 1/2018 | Gilliland | H03G 3/3005 |
| 2018/0295180 | A1* | 10/2018 | Yang | H04L 65/1083 |
| 2019/0158583 | A1* | 5/2019 | Cherepanov | H04L 67/1014 |
| 2022/0029815 | A1* | 1/2022 | Basu | H04L 9/085 |
| 2022/0278978 | A1* | 9/2022 | Das | H04L 63/083 |
| 2023/0025638 | A1* | 1/2023 | Gandhi | H04L 65/403 |

* cited by examiner

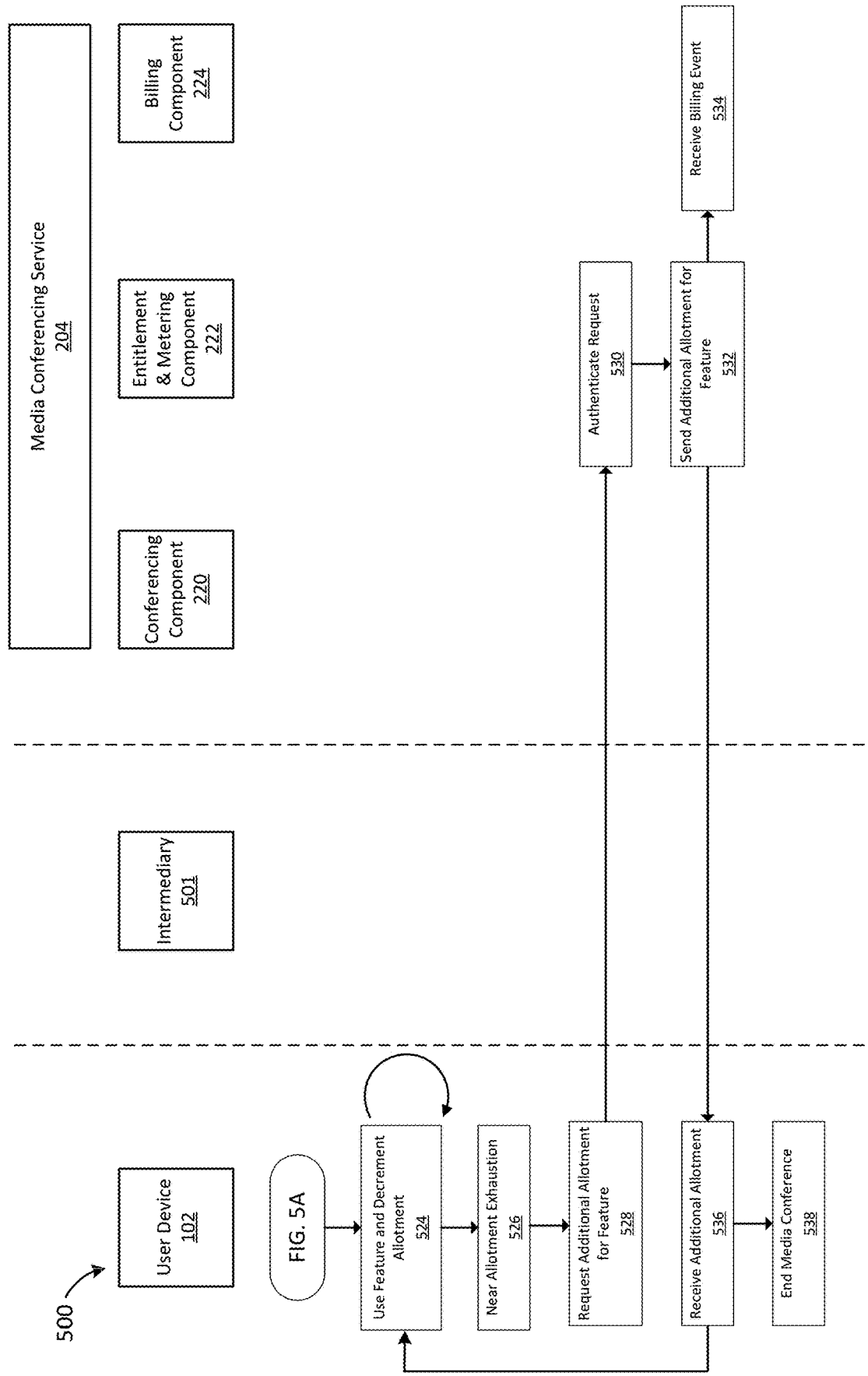

METERING CLIENT-SIDE FEATURES

BACKGROUND

Virtual meeting are often handled electronically and may involve audio and/or video in the form of media conferencing among participants. The electronic meetings are generally hosted by one or more hosting servers with which the various participants communicate over a network, such as, for example, the Internet. The participants generally communicate with the hosting servers using electronic devices such as, for example, smart phones, tablets, computers, etc. The cost for such media conferencing can vary based on the type of service and the features of the service. For example, video conferencing may be associated with a higher cost than audio conferencing as additional bandwidth and processing may be required to host a video conference. Additional features, such as noise suppression or background blurring, improve the media conferencing experience for the participants, but can also add cost to the service.

In an attempt to avoid the additional costs for such additional features, participants may attempt to alter their systems to stop sending metering events to the hosting servers, to change the system clock, to spoof the media conferencing service with information from another user, etc. Such techniques may result in lower revenue for the media conferencing service.

BRIEF DESCRIPTION OF THE DRAWINGS

The detailed description is set forth below with reference to the accompanying figures. The use of the same reference numbers in different figures indicates similar or identical items. The systems depicted in the accompanying figures are not to scale and components within the figures may be depicted not to scale with each other.

FIGS. 5A-B is a flowchart showing another example process for entitling access to features and metering use of the features on a client device.

DETAILED DESCRIPTION

This disclosure describes techniques and architecture for tracking, metering, and allotting for the use of one or more features of a media conferencing service. For example, a media conferencing service can provide participants of the media conferencing service with entitlement to various features and allotments for those features. The client, or participant, device may track the use of the features to increment a count of the use of the features or decrease the remaining allotment for the use of the features. Therefore, use of the features by the participants may be tracked and metered on the client-side to reduce the likelihood of hacking and/or spoofing in an attempt to avoid the costs associated with the features.

The features can include processing of the input signals to improve the output of a media conferencing session. The features can include, for example, noise suppression, background blurring, feature extraction, encryption, color correction, audio or video encoding, running a video game, sound effects, visual effects, augmented reality, etc. In some embodiments, these features can be executed client-side due to the processing required, however in other embodiments these features can be executed by the hosting servers of the media conferencing service.

Access to these features and the allotment for use of the features can be controlled by access tokens that originate from the media conferencing service and that are provided to the participant or client devices. The access tokens can be specific to each participant and include identifiers of the particular features that the participant is entitled to use. The access tokens can also include an allotment for each of the features so that use of each of the features is controlled. Nearing exhaustion of the allotment or upon exhaustion of the allotment and within a leniency time period, the participant or client device can request a new allotment from the media conferencing service.

Certain implementations and embodiments of the disclosure are described more fully below with reference to the accompanying figures, in which various aspects are shown. However, the various aspects may be implemented in many different forms and should not be construed as limited to the specific implementations described herein. The disclosure encompasses variations of the described embodiments.

Figure 1:
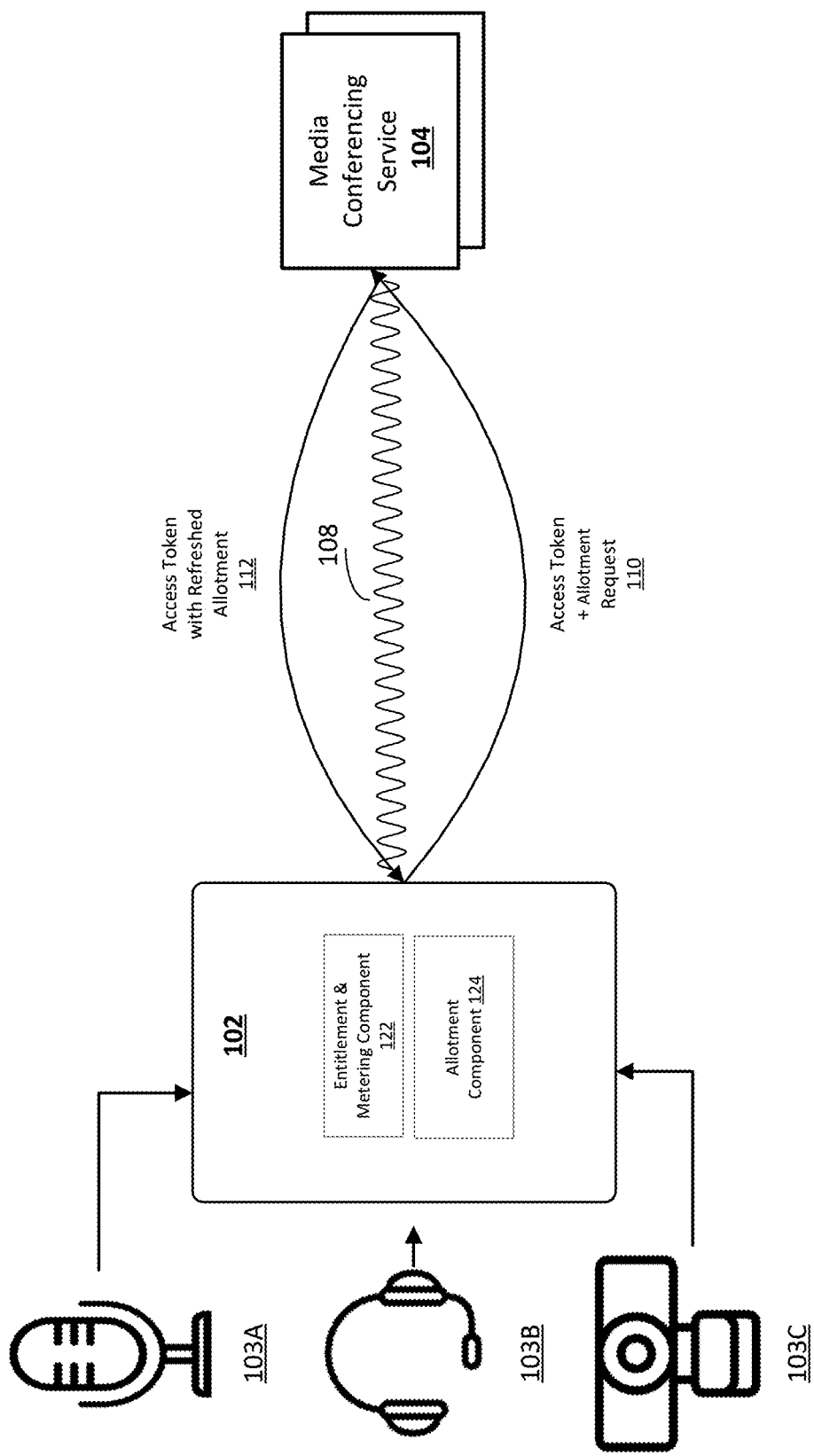
FIG. 1 schematically illustrates a high-level architecture of a client-side metering system in a media conferencing framework.

FIG. 1 illustrates a high-level architecture 100 of a media conferencing service in a service provider network, according to an embodiment. One or more participant devices 102 may provide content, such as audio signals and/or video signals 108, to a media conferencing service 104. The media conferencing service can be, for example, audio conferencing, video conferencing, chatting, gaming services, etc. The media conferencing service 104 can be implemented in one or more computing systems, such as one or more hosting servers, as explained in further detail below. The media conferencing service 104 can process the content received from the one or more participant devices 102 and output the processed content, such as the processed audio signals and/or video signals, to one or more output devices, such as the participant devices simultaneously. The participant device 102 and the output device can be, for example, a laptop, a desktop computer, a portable computing device, a smart phone, a tablet, a speaker, such as a wireless smart speaker, and/or a display, such as a television, monitor, projector, etc.

The participant device 102 can include a plurality of input devices, such as a built-in microphone or a built-in webcam, and can also be attached to external input devices 103A-C. The external input devices 103A-C can be, for example, an external microphone 103A, a headset 103B, and an external webcam 103C. The participant device 102 can generate an input signal based on its built-in input devices and/or based on any of the external input devices 103A-C. The input devices can each generate audio signals and/or video signals or used during a media conference.

The participant device 102 may include one or more components, such as an entitlement and metering component 122 and an allotment component 124. The entitlement and metering component 122 can enable use of one or more features of the media conferencing session and track the use of the one or more features in a periodic manner or based on discrete user action. For example, the entitlement and metering component 122 may increment a count of the use of each of the features based on time or consumed processing resources. If noise suppression is enabled, for example, the number of seconds that noise suppression is used can be monitored by the entitlement and metering component 122. In another example, if noise suppression is enabled, a unit measure of computing resources used by the noise suppression can be monitored by the entitlement and metering component 122.

The allotment component 124 can account for the use of the one or more features from an allowed allotment by, for example, decreasing a remaining allotment for the use of the features. The allotment for each feature can be based on an amount of usage or on a monetary value. For example, the allotment for use of noise suppression in a media conferencing session can be $1. In such an example, if noise suppression is used for 25 seconds at a cost of one cent per second, then $0.35 for the use of noise suppression may remain in the allotment. In another example, the allotment for use of noise suppression in a media conferencing session can be 30 seconds. In such an example, if noise suppression is used for 25 seconds, then 5 seconds for the use of noise suppression may remain in the allotment.

Following the establishment of a media conference session, the participant device 102 can send a request 110 for an access token and an allotment. The request 110 can also include an identifier of the participant device 102 to enable the media conferencing service 104 to verify the request 110. The identifier of the participant device 102 can be, for example, a user identifier, a MAC address, an IP address, a fingerprint of the participant device 102, etc. Upon reception of the request 110, the media conferencing service 104 can verify the participant device 102 based on the identifier and determine the entitlements to the features and the allotments associated with those entitlements for the participant device 102. The media conferencing service can then send an access token 112 including the entitlements to the various features of the media conferencing service and the allotments associated with those features to the participant device 102. The entitlement and metering component 122 uses the access token 112 to enable access to features of the media conference service and the allotment component 124 uses the allotments specified in the access token 112 to allot an allotment for each feature.

The allocation of allotment for each feature can be done on a periodic basis or based on discrete user action. For example, the count for the use of each feature may be incremented or correspondingly reduced from the allotment every 500 milliseconds. Near exhaustion of the allotment for a particular feature, the participant device 102 can send another request 110 to the media conferencing service 104 for additional allotment. For example, when the allotment for a particular feature is within a threshold amount to zero, the participant device 102 can send another request 110 to the media conferencing service 104 for additional allotment. In a particular example, if the allotment for noise suppression is $1, the participant device 102 can send another request 110 to the media conferencing service 104 for additional allotment when there is 10 cents, or 10% of the original allotment, remaining. The threshold can be based on one or more characteristics of the participant device 102, the type of media conference, and the network quality. For example, the greater the latency in the network, the greater the threshold from zero in order to provide additional time for reception of additional allotment and minimize the interruption in the use of the feature.

If the allotment for the particular feature is exhausted while awaiting the additional allotment, the participant device 102 can be allowed to continue use of the feature for a leniency time period so that the quality and user experience of the media session is not degraded. The leniency time period can be based on one or more characteristics of the participant device 102, the type of media conference, and the network quality. For example, the leniency time period for a presenter in the media conference can be greater than the leniency time period for a participant in the media conference so that the presented content in the media conference has a higher likelihood of maintaining the same quality. In another example, the leniency time period associated with a video conference can be greater than the leniency time period associated with an audio conference because the processing required for a video conference may be greater than the processing required for an audio conference. In yet another example, it may be known that the time for requesting and receiving additional allotment is 250 milliseconds due to latency in the network. In such example, the leniency time period can be set to 250 milliseconds or slightly greater than 250 milliseconds so that additional allotment is allotted before use of the feature by the participant device 102 is interrupted.

As the participant device 102 requests additional allotment, the total allotment used for the feature by the participant device 102 or by a group of participant devices can be monitored by the media conferencing service 104. The total allotment can be used by the media conferencing service 104 for billing, throttling, reporting, or other processes or services. In addition, if the total allotment for the participant device 102 or for a group of participant devices is exhausted, then no additional allotment will be provided in response to an allotment request 110. The number of requests 110 for additional allotment can also be limited to a predetermined number. As such, misuse of a client-side feature can be prevented if the feature or the media conferencing software is incorrectly implemented or if a hacker steals the access token.

Figure 2:
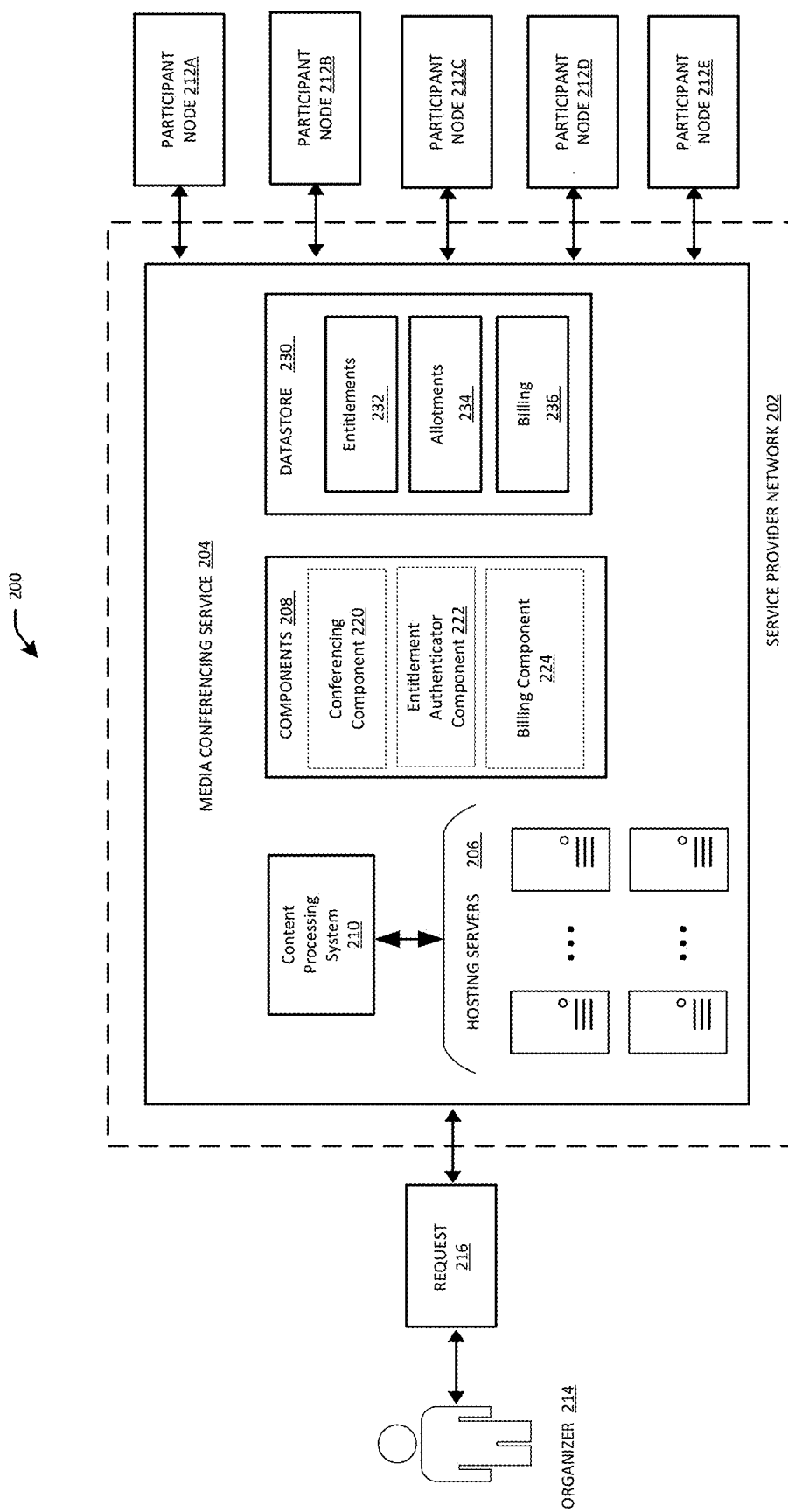
FIG. 2 schematically illustrates a system-architecture diagram of an example service provider network that provides a media conferencing service.

FIG. 2 schematically illustrates an example environment 200 that includes a service provider network 202. The service provider network 202 provides various services to users, such as participant nodes 212A-E, which can be the one or more participant devices 102 or the one or more output devices, or systems including the one or more participant devices 102 or the one or more output devices 106. The participant nodes 212A-E may also be referred to as computing nodes. The service provider network 202 can include various types of computing resources, such as data processing resources like data storage resources, networking resources, data communication resources, network services, and the like. Common expressions associated with the service provider network may include, for example. "on-demand computing." "software as a service (Saas)," "cloud services," "data centers," and so forth. Services provided by the service provider network 202 may be distributed across one or more physical or virtual devices.

In the example environment 200, the service provider network 202 includes a media conferencing service 204, such as an audio or video conferencing service. The media conferencing service 204 may include multiple hosting servers 206. In some embodiments, the media conferencing service 204 also includes components 208, a content processing system 210, and a datastore 230. The media conferencing service 204 may facilitate initiation of the media conference or may otherwise allow the media conference to take place via hosting servers 206.

Multiple participant nodes 212A-E are illustrated in the example environment 200. The participant nodes 212A-E represent computing nodes, participants, input devices, output devices, clients, bots, and/or users for media conferences provided by the media conferencing service 204. The participant nodes 212A-E interact with the media conferencing service 204 and the hosting servers 206 via electronic devices such as, for example, smart phones, tablets, laptop computers, desktop computers, telephones, etc. In some embodiments, at least one of the participant nodes 212A-E may be a bot that is configured to interact in the video conference instead of a human participant. In configurations, the media conferences may comprise text, audio, and/or video, e.g., one or more of the participant nodes 212A-E may participate in a media conference that includes both audio and video. Text, audio, and/or video content can be sent between the participant nodes 212A-E via the media conferencing service 204. The media conference may be part of a gaming platform.

When one or more of the participant nodes 212A-E wishes to participate in a media conference, an organizer 214 of the media conference may send a request 216 for the media conference to the media conferencing service 204. The organizer 214 may also be a participant in the media conference. Content processed by the content processing system 210 can be broadcast to one or more of the participant nodes 212A-E simultaneously.

The conferencing component 220 may initiate the media conference based on the request 216 received from the organizer 214 and authenticate the participant nodes 212A-E. The conferencing component 220 may authenticate the participant nodes 212A-E of the media conference based on identifiers of the participant nodes 212A-E and/or objects received from the participant nodes 212A-E. The conferencing component 220 may determine which participants connect to the media conferencing service 204 over time, how long they are connected to the media conferencing service 204, what devices are used by the users to connect, and the types of media conferencing services that are used, such as video, audio, text, and gaming. In some embodiments, the conferencing component 220 may continually monitor the participants of a media conference. For example, if additional participant nodes 212A-E join the media conference or if participation nodes 212A-E leave the media conference before the media conference is completed, the conferencing component 220 may record the times of arrival and the times of exit of the participants in the media conference.

The entitlement authenticator component 222 can determine which features of a media conference each participant node 212A-E is entitled to use and the allotments for each or all of those features. The entitlement to the features for each participant node 212A-E and the allotment for those features can be identified by the organizer 214, by an organization that is hosting the media conference, by an employer of the participant nodes 212A-E. or by the media conferencing service 204. The entitlement authenticator component 222 can associate each participant node 212A-E with the entitlements and allotments based on an identifier of the participant in the media conference or based on an identifier or other characteristic of the participant node 212A-E. For example, a supervisor in an organization may be entitled to more features or additional allotment relative to another employee. In another example, a primary presenter in a media conference may be entitled to more features or additional allotment relative to another participant in the media conference. In yet another example, one organization may provide its employees with additional features or allotment relative to another organization. The entitlements can be retrieved from the entitlements database 232 and the allotments can be retrieved from the allotments database 234.

The entitlements in the entitlements database 232 and the allotments in the allotments database 234 can be associated with various identifiers, such as identifiers of participants, of the participant nodes to 212A-E. and of organizations. The entitlements in the entitlements database 232 and the allotments in the allotments database 234 can be updated over time based on preferences of the organizer 214, the organization that is hosting the media conference, the employer of the participant nodes 212A-E. or the media conferencing service 204, or based on use of the features during one or more media conferences. For example, once the allotment for voice suppression for a particular participant or for all of the participants belonging to an organization is exhausted, then the entitlement to voice suppression for that participant or for all of the participants belonging to the organization can be removed. As another example, the allotment for every feature stored in the allotment database 234 can be updated, i.e., reduced, as requests 110 for additional allotment are received from the participant nodes 212A-E. In the same example, the allotment for every feature stored in the allotment database 234 can be updated, i.e., increased, as the costs for those features are billed or received.

The billing component 224 may determine how much allotment has been used for the one or more features of the media conference to determine when and how much to bill a participant or an organization. For example, once the costs for use of a particular feature or a group of features exceeds a threshold amount, the billing component 224 may submit a bill to the participant or the organization, or may deduct the costs from an account associated with the participant or the organization. In another example, the costs for use of a particular feature or a group of features can we billed based on a predetermined time, such as on a monthly interval. A history of the costs billed and received from the participant or their organization may be stored in the billing database 236.

Figure 3:
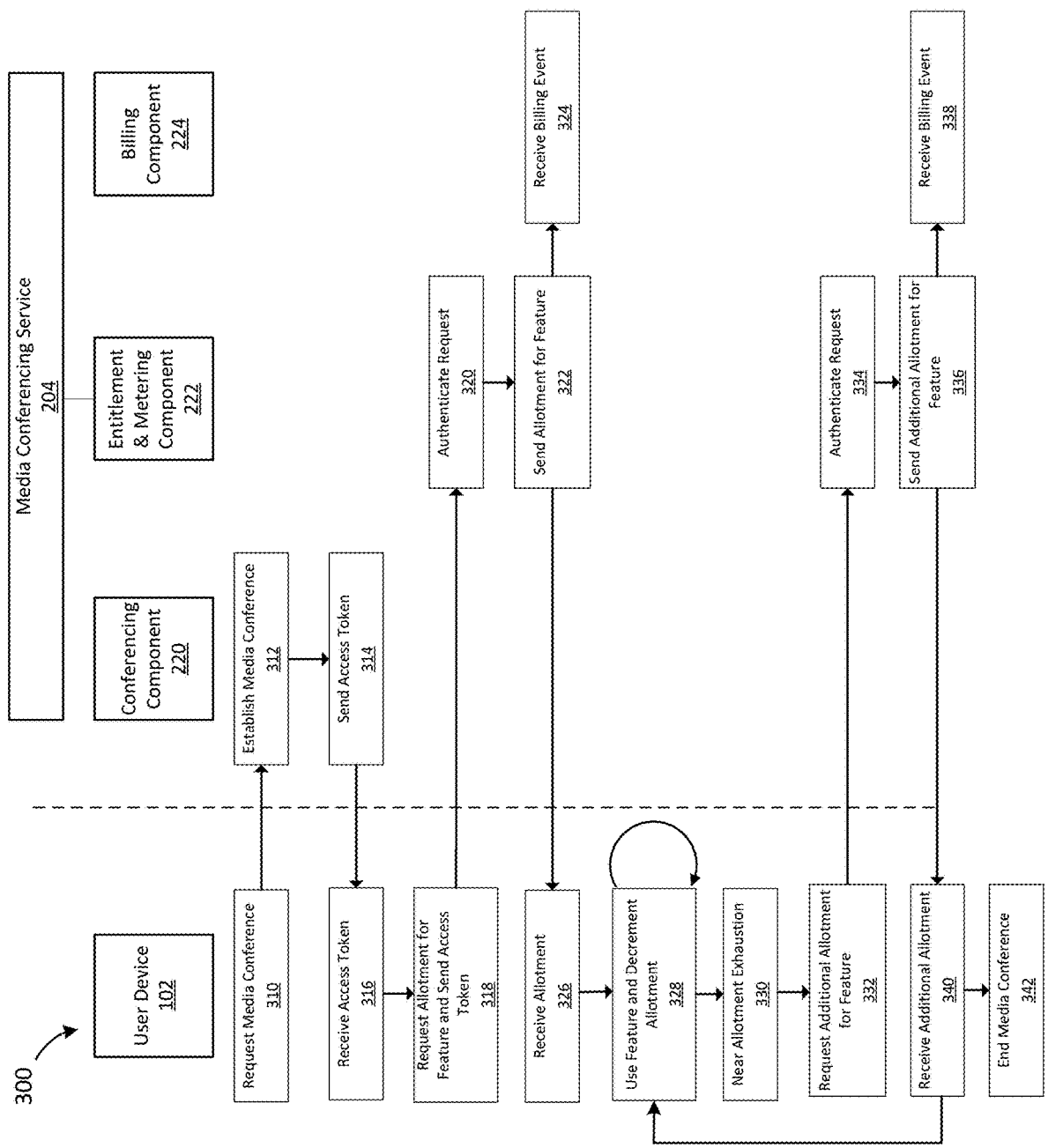
FIG. 3 is a flowchart showing an example process for entitling access to features and metering use of the features on a client device.

FIG. 3 illustrates a flow diagram of an example method 300 that illustrates aspects of the functions performed at least partly by the participant or user device 102 and the media conferencing service 204. The example method 300 may be implemented to enable and meter client-side features for use during a media conference. For example, the method 300 may be implemented to forward access tokens to participants of a media conference of the media conferencing service 204 for entitling, allotting for, and metering features of the media service on client-side devices. The logical operations described herein with respect to FIG. 3 may be implemented (1) as a sequence of computer-implemented acts or program modules running on a computing system, and/or (2) as interconnected machine logic circuits or circuit modules within the computing system.

The implementation of the various components described herein is a matter of choice dependent on the performance and other requirements of the computing system. Accordingly, the logical operations described herein are referred to variously as operations, structural devices, acts, or modules. These operations, structural devices, acts, and modules can be implemented in software, in firmware, in special purpose digital logic, and any combination thereof. It should also be appreciated that more or fewer operations might be performed than shown in the FIG. 3, and described herein. These operations can also be performed in parallel, or in a different order than those described herein. Some or all of these operations can also be performed by components other than those specifically identified. Although the techniques described in this disclosure are with reference to specific components, in other examples, the techniques may be implemented by less components, more components, different components, or any configuration of components.

At block 310, a user device 102 requests a media conference. The request may include an identifier of the organizer 214, identifiers of the participant nodes 212A-E, the type of media conference, a date, time, and/or duration for the media conference. The type of media conference can be an audio conference, a video conference, a chat session, or a gaming session. The request may also include an anticipated location for each participant node 212A-E. The participants, such as the organizer 214 and the participant nodes 212A-E. of the media conference may belong to the same organization or may belong to different organizations, such as different corporations. The request can also include programmable instructions regarding the layout of the media conference.

At block 312, the conferencing component of the media conferencing service 204 receives the request and authenticates the request to establish a media conference. The media conference can be established between the organizer 214 and one of more of the participant nodes 212A-M. or only between the participant nodes 212A-M, via the hosting servers 206. The media conferencing service 204 can authenticate the request based on an identifier of the user device 102 or a shadow object received from the organizer including characteristics and/or keys associated with the user device 102. The shadow objects can be, for example, cookies, tokens, session identifiers. WebSocket identifiers, client certificate chains, metadata in the HTTP or Transport Layer Security protocols, or another tracer that can be used to identify a user of the media conferencing service 204. The shadow object received from the user device 102 can be compared to stored shadow objects to determine a match to authenticate the request.

The shadow object received at the media conferencing service 204 may have previously been transmitted to the user device 102 upon the first participation of the user device 102 in a media conference of the media conferencing service 204. For example, the first time the user device 102 participates in a media conference, the media conferencing service 204 may forward a shadow object to the user device 102. The shadow object may be based on identification information or login information of the user, so that if the user connects to the media conferencing service 204 from multiple user devices, the same shadow object may be sent to the different user devices. That same shadow object may then be transmitted back to the media conferencing service 204 when requesting a media conference at block 310.

Figure 4:
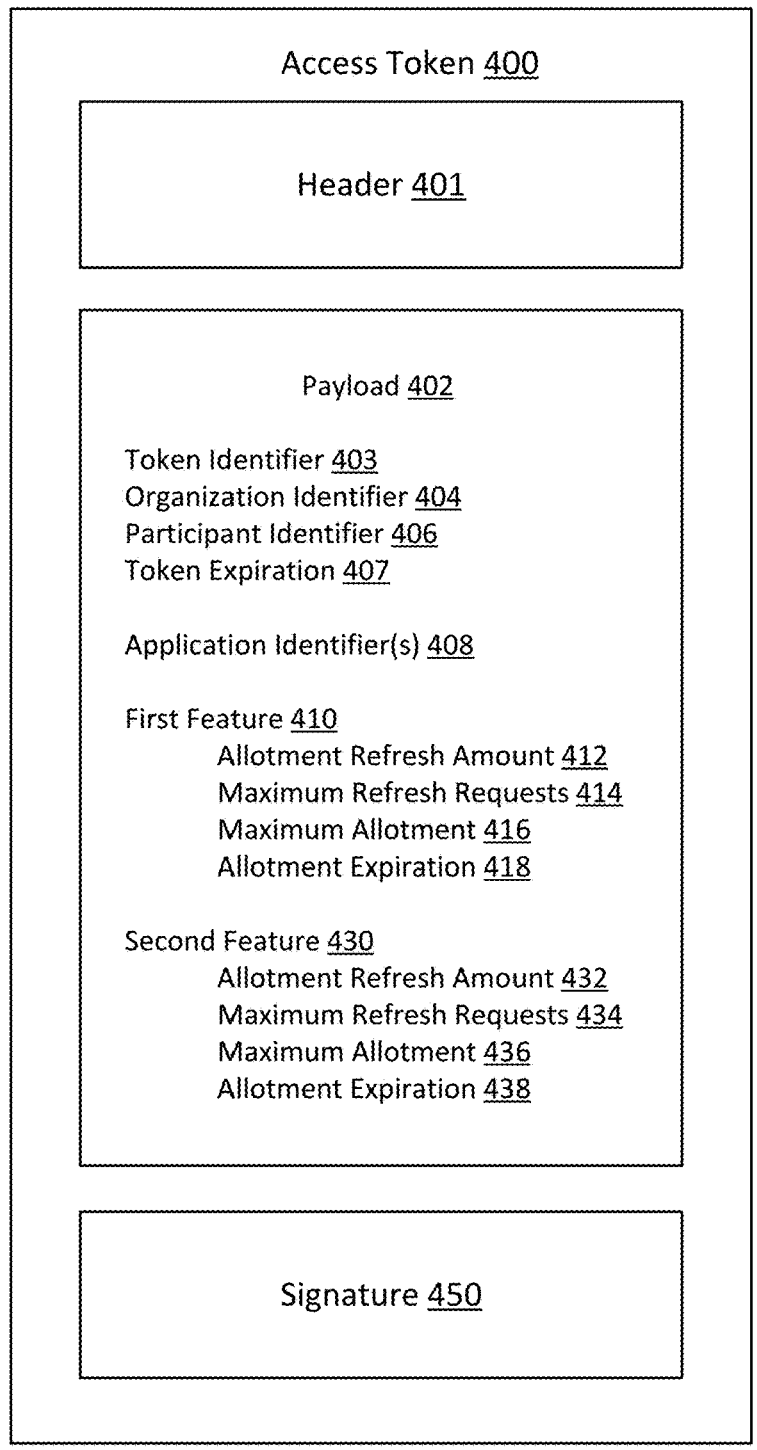
FIG. 4 schematically illustrates an access token.

Upon establishing the media conference, at block 314, the conferencing component 220) can send an access token to the user device 102. The access token that is sent at block 314 can be encoded so that it is not altered. Referring to FIG. 4, the access token 400 can include a header 401, a payload 402, and a signature 450. The access token can be, for example, a JSON Web Token (JWT) that enables transmission of the payload 402 with the signature 450 for authentication. The access token 400 can be encrypted using a private secret or a public/private key.

The header 401 can identify the algorithm used to generate the signature. The signature 450) can be used to securely validate the access token 400, such as in steps 320, 334, 516, and 530, which are described in greater detail below. In one example, the signature 450 can be calculated by encoding the header 401 and payload 402 and concatenating the two together. The payload 402 can include one or more of a plurality of fields. For example, the payload 402 can include a token identifier 403 that uniquely identifies the access token 400, an organization identifier 404 that identifies an organization to which the user device 102 or the participant in the media conference belongs or the organization that is hosting the media conference, a participant identifier 406 that uniquely identifies the participant using the user device 102, and a token expiration 407 after which the access token 400 is no longer valid. The payload 402 can also include an application identifier 408 that identifies the type of application being used by the user device 102 to access the media conference. The type of application can be, for example, a web browser application, a standalone application, or a third-party application utilizing the media conferencing service 204 via a software development kit (SDK).

The payload 402 can further include identifiers or one or more features, such as a first feature 410) and a second feature 430, that the user device 102 is entitled to use during the media conference. The first feature 410 and the second feature 430 may be different features that can be used simultaneously or at different times during the media conference. For each feature, the payload 402 can specify an allotment refresh amount 412, 432 that allocates the amount of allotment for the feature at the start of each refresh, a maximum number of refresh requests 414, 434, a maximum allotment 416, 436 that can be used for the feature, and an allotment expiration 418, 438.

At block 316, the user device 102 receives the access token 400 and then requests allotment for a feature, such as the first feature 410) and the second feature 430, that the user device 102 will use during the media conference at block 318. When requesting the allotment for the feature, the user device 102 can also send the access token 400 to the media conferencing service 204 at block 318. In addition, the user device 102 can request program code to execute the feature upon receiving entitlement for the feature in the access token 400.

At block 320, the media conferencing service 204 can authenticate the request for the allotment. For example, the request can be authenticated by first verifying the signature 450 and then determining that the token has not expired based on the token expiration 407 in the payload 402. The entitlements included for the user device 102 in the payload 402 can also be verified. In such an example, if the requested allotment is for the first feature 410, and the maximum number of refresh requests 414, the maximum allotment 416, the and allotment expiration 418 have not been reached, the allotment refresh amount 412 may be allocated to the user device 102 for using the first feature 410 during the media conference.

At block 322, the allotment for the feature is sent from the media conferencing service 204 to the user device 102 upon authentication of the request for the allotment at block 320. The allotment is then received by the user device 102 at block 326. In addition, a billing event can be initiated by the entitlement and metering component 222 and sent to the billing component 224 so that the costs for the use of the feature can be collected. At block 324, the billing component 224 receives the billing event.

At block 328, the user device 102 meters the use of the feature. For example, the user device 102 can decrement the allotment allocation for the feature periodically during use of the feature, such as in six second increments, or based on discrete user action. In such an example, if each allotment allocation is for $0.30 and each second of use of the feature costs $0.01, the allotment allocation can be decremented by $0.06 a total of five times until the allotment is exhausted. One the allotment allocated is reduced to zero or a negative value, it is determined that the allotment is exhausted at block 330. In some embodiments, instead of decrementing the allotment, a count of the use of the feature can be incremented until a maximum allocated count is reached, as described in greater detail above.

At block 332, the user device 102 can request an additional allotment allocation in response to determining that the allotment allocation is near exhaustion at block 330. The allotment allocation is near exhaustion when it is within a threshold value of zero. For example, a threshold amount or threshold percentage of the original allotment may be remaining when the request for additional allotment allocation is made at block 332. Before requesting the additional allotment allocation, the user device 102 can determine whether the maximum number of refresh requests 414, 434, the maximum allotment 416, 436, and the allotment expiration 418, 438 have been reached based on the specifications of the access token 400. If the maximum number of refresh requests 414, 434, the maximum allotment 416, 436, or the allotment expiration 418, 438 have been reached, then no further requests for additional allotment may be sent to the media conferencing service 204 at block 332. However, if the maximum number of refresh requests 414, 434, the maximum allotment 416, 436, or the allotment expiration 418, 438 have not been reached, then the request for additional allotment may be sent to the media conferencing service 204 at block 332. The allotment request at block 332 can include the access token 400.

In addition, the user device 102 may continue use of the feature during the media conference for a leniency time period following the allotment associated with the feature being exhausted so that the quality and user experience of the media session is not degraded. The leniency time period can be based on one or more characteristics of the participant device 102, the type of media conference, and the network quality, as described in greater detail above.

At block 334, the media conferencing service 204 can authenticate the request for the additional allotment. For example, the request can be authenticated based on first verifying the signature 450) and then determining that the token has not expired based on the token expiration 407 in the payload 402. The entitlements included for the user device 102 in the access token 400 can also be verified.

At block 336, the additional allotment for the feature is sent from the media conferencing service 204 to the user device 102 upon authentication of the request for the additional allotment at block 334. The additional allotment that is sent at block 336 can be encoded and then decoded at the user device 102 so that it is not altered. The allotment is then received by the user device 102 at block 340. In some embodiments, the additional allotment can be the same as the initial allotment, which is specified in field 412, 432 of the access token 400. In other embodiments, the additional allotment can be for a different amount from the initial allotment. For example, the additional allotments may incrementally reduce in size as the maximum allotment is reached. In addition, a billing event can be initiated by the entitlement and metering component 222 and sent to the billing component 224 so that the costs for the use of the feature can be collected. At block 338, the billing component 224 receives the billing event. The user device 102 can then continue to meter use of the feature at block 328.

In some embodiments, all of the billing events can be collected by the billing component 224 for the user device 102 or for a group of participants in the media conference, such as those participants belonging to the same organization. A sum of the costs associated with all the billing events can then be collected upon completion of the media conference or at a predetermined interval, such as the end of a month. In some embodiments, the costs associated with each billing event can be collected individually. In some embodiments, the media conferencing service 204 may output a metric for the use of the one or more features by the user device. The metric can be, for example, the costs associated with the use of a feature, a count associated with the duration of use of the feature, and/or processing power required for using the feature.

At block 342, the media conference ends. The media conference can be ended by, for example, the organizer 214, which may end the media conference for all of the participants, thereby stopping the metering of the features at block 328 for all participants. The media conference can also be ended by a particular participant node 212A-E, thereby stopping the metering of the features at block 328 for only that participant.

Figure 5A:
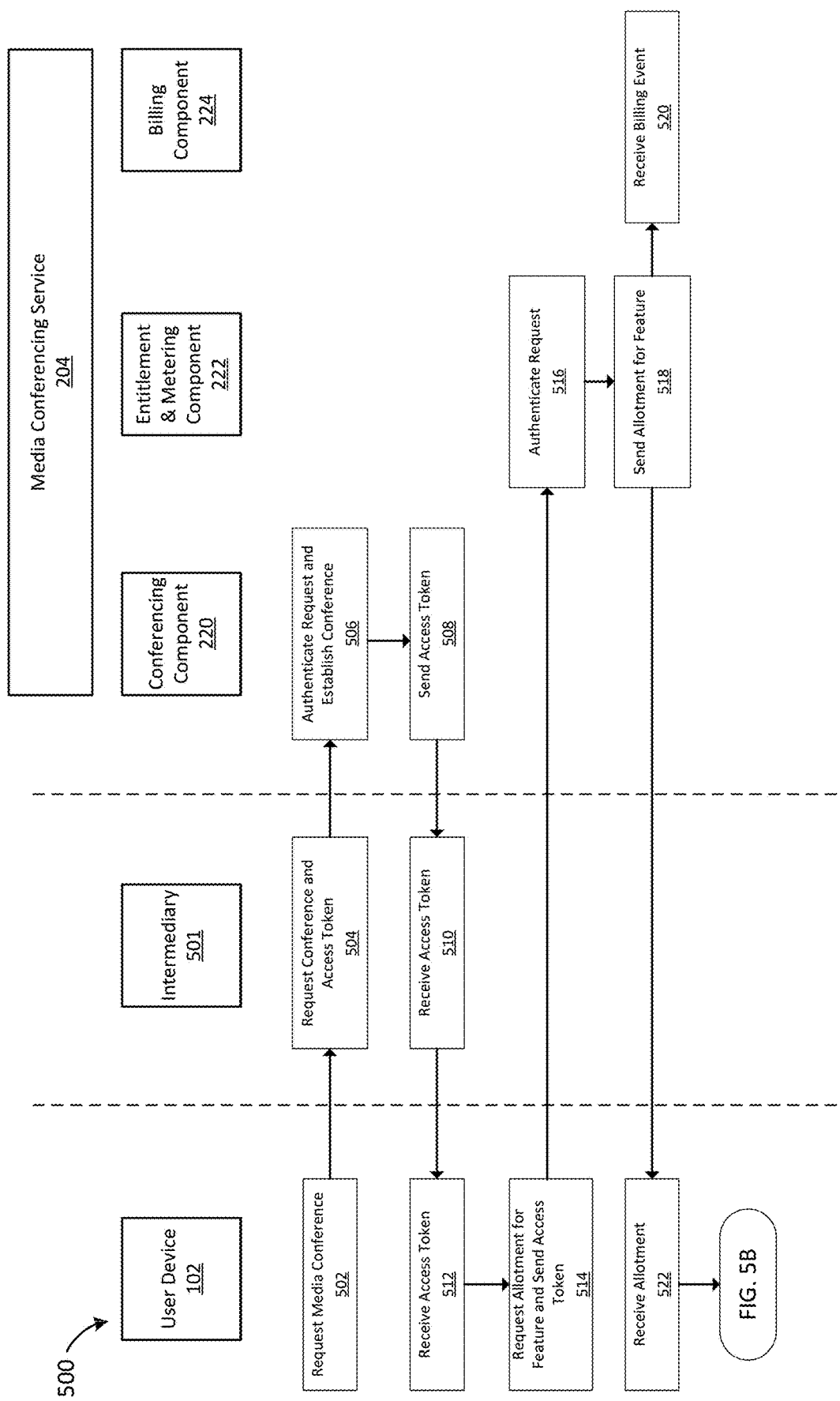

FIGS. 5A-B illustrate a flow diagram of an example method 500 that illustrates aspects of the functions performed at least partly by the participant or user device 102, an intermediary 501, and the media conferencing service 204. The example method 500 may be implemented to enable and meter client-side features for use during a media conference via an intermediary that provides media conferencing services via a software development kit (SDK) provided by the media conferencing service 204. For example, the method 500 may be implemented to forward access tokens to participants of a media conference provided by the intermediary 501 for entitling, allotting, and metering features of the media service on client-side devices. The logical operations described herein with respect to FIGS. 5A-B may be implemented (1) as a sequence of computer-implemented acts or program modules running on a computing system, and/or (2) as interconnected machine logic circuits or circuit modules within the computing system.

The implementation of the various components described herein is a matter of choice dependent on the performance and other requirements of the computing system. Accordingly, the logical operations described herein are referred to variously as operations, structural devices, acts, or modules. These operations, structural devices, acts, and modules can be implemented in software, in firmware, in special purpose digital logic, and any combination thereof. It should also be appreciated that more or fewer operations might be performed than shown in the FIGS. 5A-B, and described herein. These operations can also be performed in parallel, or in a different order than those described herein. Some or all of these operations can also be performed by components other than those specifically identified. Although the techniques described in this disclosure are with reference to specific components, in other examples, the techniques may be implemented by less components, more components, different components, or any configuration of components.

At block 502, the user device 102 requests a media conference. The request may include an identifier of the organizer 214, identifiers of the participant nodes 212A-E, the type of media conference, a date, time, and/or duration for the media conference. The type of media conference can be an audio conference, a video conference, a chat session, or a gaming session. The request may also include an anticipated location for each participant node 212A-E. The participants, such as the organizer 214 and the participant nodes 212A-E, of the media conference may belong to the same organization or may belong to different organizations, such as different corporations. The request can also include programmable instructions regarding the layout of the media conference.

At block 504, the intermediary 501 receives the request and authenticates the request. The intermediary 501 can authenticate the request based on an identifier of the user device 102 or a shadow object received from the user device 102 including characteristics and/or keys associated with the organizer 214. The shadow objects can be, for example, cookies, tokens, session identifiers, WebSocket identifiers, client certificate chains, metadata in the HTTP or Transport Layer Security protocols, or another tracer that can be used to identify a user of the media conferencing service 204. The shadow object received from the user device 102 can be compared to stored shadow objects to determine a match to authenticate the request.

The shadow object received at the intermediary 501 may have previously been transmitted to the user device 102 upon the first participation of the user device 102 in a media conference organized by the intermediary 501. For example, the first time the user device 102 participates in a media conference, the intermediary 501 may forward a shadow object to the user device 102. The shadow object may be based on identification information or login information of the user.

At block 504, the intermediary 501 can also request an access token from the conferencing component 220 of the media conferencing service 204. The request for the access token can be based on an application programming interface (API) provided by the media conferencing service 204 to the intermediary 501.

At block 506, the media conferencing service 204 can authenticate the request for the access token based on an identifier of the intermediary 501 or a shadow object received from the intermediary 501 including characteristics and/or keys associated with the intermediary 501. The shadow objects can be, for example, cookies, tokens, session identifiers, WebSocket identifiers, client certificate chains, metadata in the HTTP or Transport Layer Security protocols, or another tracer that can be used to identify the intermediary 501 of the media conferencing service 204. The shadow object received from the intermediary 501 can be compared to stored shadow objects to determine a match to authenticate the request. Upon authentication of the request, the media conferencing service 204 can also establish the media conference.

At block 508, the media conferencing service 204 can send the access token to the intermediary 501, which receives the access token at block 510. The access token can be the access token 400 illustrated in FIG. 4. The access token can then be stored by the intermediary 501 and then provided to a user device 102, which receives the access token 400 at block 512.

At block 514, the user device 102 requests allotment for a feature, such as the first feature 410 and the second feature 430, that the user device 102 will use during the media conference. When requesting the allotment for the feature, the user device 102 sends the access token to the media conferencing service 204.

At block 516, the conferencing component 220 of the media conferencing service 204 can authenticate the request for the allotment by first verifying the signature 450 and then determining that the token has not expired based on the token expiration 407 in the payload 402. In addition, the entitlements included for the user device 102 in the payload 402 can be verified. In such an example, if the requested allotment is for the first feature 410, and the maximum number of refresh requests 414, the maximum allotment 416, the and allotment expiration 418 have not been reached, the allotment refresh amount 412 may be allocated to the user device 102 for using the first feature 410 during the media conference.

At block 518, the allotment for the feature is sent from the media conferencing service 204 to the user device 102 upon authentication of the request for the allotment at block 516. The allotment that is sent at block 518 can be encoded and then decoded at the user device 102 so that it is not altered. The allotment is then received by the user device 102 at block 522. In addition, a billing event can be initiated by the entitlement and metering component 222 and sent to the billing component 224 so that the costs for the use of the feature can be collected. At block 520, the billing component 224 receives the billing event.

Referring to FIG. 5B, At block 524, the user device 102 meters the use of the feature. For example, the user device 102 can decrement the allotment allocation for the feature periodically during use of the feature, such as in six second increments, or based on discrete user action. In such an example, if each allotment allocation is for $0.30 and each second of use of the feature costs $0.01, the allotment allocation can be decremented by $0.06 a total of five times until the allotment is exhausted. At block 526, it is determined that the allotment allocated is near exhaustion. The allotment allocation is near exhaustion when it is within a threshold value of zero. For example, a threshold amount or threshold percentage of the original allotment may be remaining when the request for additional allotment allocation is made at block 528. In some embodiments, instead of decrementing the allotment, a count of the use of the feature can be incremented until a maximum allocated count is reached, as described in greater detail above.

At block 528, the user device 102 can request an additional allotment allocation in response to determining that the allotment allocation is near exhaustion at block 526. Before requesting the additional allotment allocation, the user device 102 can determine whether the maximum number of refresh requests 414, 434, the maximum allotment 416, 436, and the allotment expiration 418, 438 have been reached based on the specifications of the access token. If the maximum number of refresh requests 414, 434, the maximum allotment 416, 436, or the allotment expiration 418, 438 have been reached, then no further requests for additional allotment may be sent to the media conferencing service 204 at block 532. However, if the maximum number of refresh requests 414, 434, the maximum allotment 416, 436, or the allotment expiration 418, 438 have not been reached, then the request for additional allotment may be sent to the media conferencing service 204 at block 528. The request for additional allotment can include the access token 400.

In addition, the user device 102 may continue use of the feature during the media conference for a leniency time period following the allotment associated with the feature being exhausted so that the quality and user experience of the media session is not degraded. The leniency time period can be based on one or more characteristics of the participant device 102, the type of media conference, and the network quality, as described in greater detail above. The leniency time period can also be defined by the intermediary 501.

At block 530, the media conferencing service 204 can authenticate the request for the additional allotment. For example, the request can be authenticated by first verifying the signature 450) and then determining that the token has not expired based on the token expiration 407 in the payload 402. The entitlements included for the user device 102 in the payload 402 can also be verified.

At block 532, the additional allotment for the feature is sent from the media conferencing service 204 to the user device 102 upon authentication of the request for the additional allotment at block 530. The additional allotment that is sent at block 532 can be encoded and then decoded at the user device 102 so that it is not altered. The allotment is then received by the user device 102 at block 536. The user device 102 can then meter use of the feature at block 524.

In some embodiments, the additional allotment can be the same as the initial allotment, which is specified in field 412, 432 of the access token. In other embodiments, the additional allotment can be for a different amount from the initial allotment. For example, the additional allotments may incrementally reduce in size as the maximum allotment is reached. In addition, a billing event can be initiated by the entitlement and metering component 222 and sent to the billing component 224 so that the costs for the use of the feature can be collected. At block 534, the billing component 224 receives the billing event.

In some embodiments, all of the billing events can be collected by the billing component 224 for the user device 102 or for a group of participants in the media conference, such as those participants belonging to the same organization. A sum of the costs associated with all the billing events can then be collected upon completion of the media conference or at a predetermined interval, such as the end of a month. In some embodiments, the costs associated with each billing event can be collected individually. In some embodiments, the media conferencing service 204 may output a metric for the use of the one or more features by the user device. The metric can be, for example, the costs associated with the use of a feature, a count associated with the duration of use of the feature, and/or processing power required for using the feature.

At block 538, the media conference ends. The media conference can be ended by, for example, the organizer 214, which may end the media conference for all of the participants, thereby stopping the metering of the features at block 524 for all participants at block 328. The media conference can also be ended by a particular participant node 212A-E, thereby stopping the metering of the features at block 524 for only that participant.

The implementation of the various components described herein is a matter of choice dependent on the performance and other requirements of the computing system. Accordingly, the logical operations described herein are referred to variously as operations, structural devices, acts, or modules. These operations, structural devices, acts, and modules can be implemented in software, in firmware, in special purpose digital logic, and any combination thereof. It should also be appreciated that more or fewer operations might be performed than shown in FIGS. 3 and 5A-B, and described herein. These operations can also be performed in parallel, or in a different order than those described herein. Some or all of these operations can also be performed by components other than those specifically identified. Although the techniques described in this disclosure are with reference to specific components, in other examples, the techniques may be implemented by less components, more components, different components, or any configuration of components.

Figure 6:
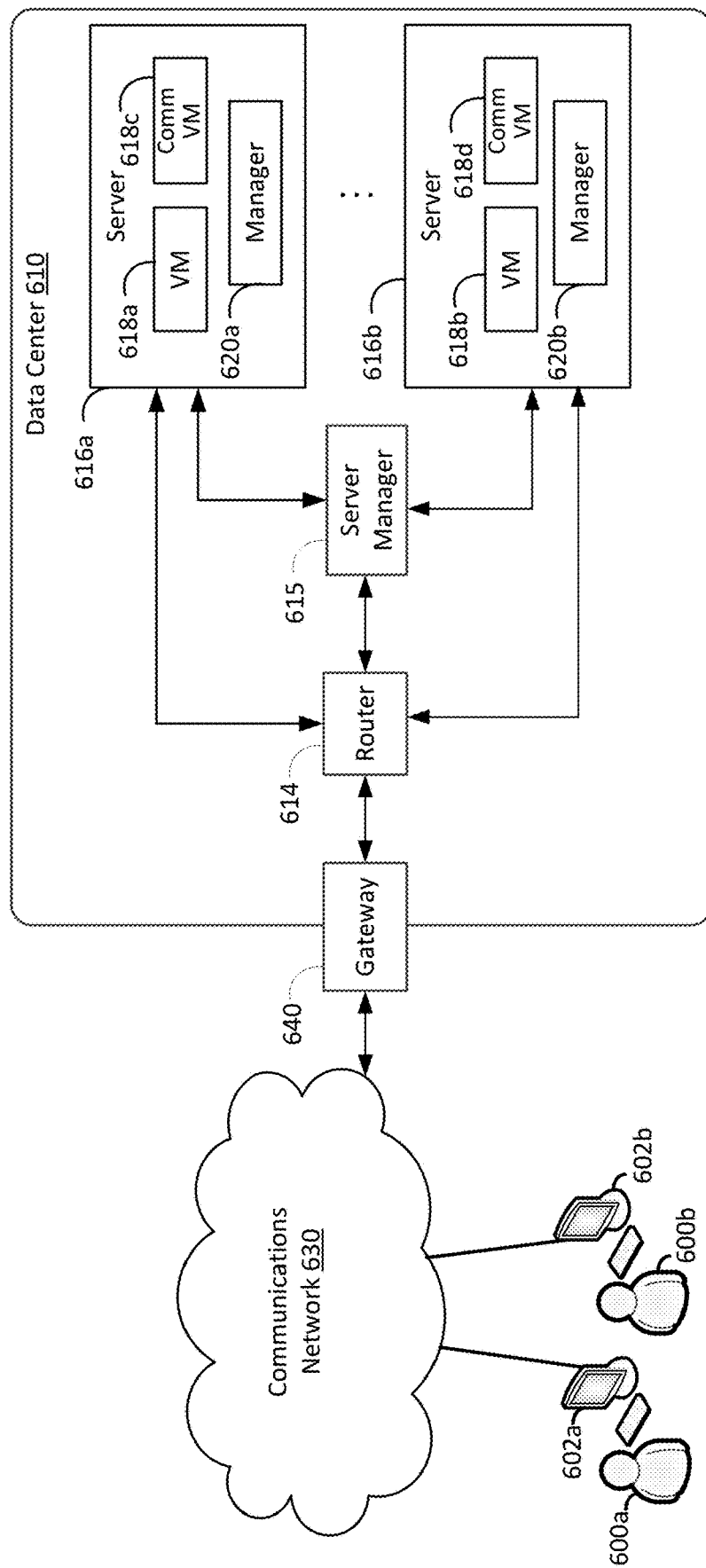
FIG. 6 is a diagram illustrating an example computing system that may be used in some embodiments.

FIG. 6 illustrates an example computing environment in which the embodiments described herein may be implemented. The example computing environment of FIG. 6 may be configured to implement one or more of the services platform, such as the media conferencing service 104 of FIG. 1 or the media conferencing service 204 of FIG. 2. The example computing environment of FIG. 6 may be configured to implement any of the methods described herein, such as any methods (e.g., or any operations) associated with FIGS. 3 and 5A-B.

FIG. 6 is a diagram schematically illustrating an example of a data center 610 that can provide computing resources to users 600a and 600b (which may be referred herein singularly as user 600 or in the plural as users 600) via user computers 602a and 602b (which may be referred herein singularly as computer 602 or in the plural as computers 602) via a communications network 630. Data center 610 may be configured to provide computing resources for executing applications on a permanent or an as-needed basis. The computing resources provided by data center 610 may include various types of resources, such as gateway resources, load balancing resources, routing resources, networking resources, computing resources, volatile and non-volatile memory resources, content delivery resources, data processing resources, data storage resources, data communication resources, and the like. Each type of computing resource may be general-purpose or may be available in a number of specific configurations. For example, data processing resources may be available as virtual machine instances that may be configured to provide various web services. In addition, combinations of resources may be made available via a network and may be configured as one or more web services. The instances may be configured to execute applications, including web services, such as application services, media services, database services, processing services, gateway services, storage services, routing services, security services, encryption services, load balancing services, application services and the like. These web services may be configurable with set or custom applications and may be configurable in size, execution, cost, latency, type, duration, accessibility, and in any other dimension. These web services may be configured as available infrastructure for one or more clients and can include one or more applications configured as a platform or as software for one or more clients. These web services may be made available via one or more communications protocols. These communications protocols may include, for example, hypertext transfer protocol (HTTP) or non-HTTP protocols. These communications protocols may also include, for example, more reliable transport layer protocols such as transmission control protocol (TCP) and less reliable transport layer protocols such as user datagram protocol (UDP). Data storage resources may include file storage devices, block storage devices and the like.

Each type or configuration of computing resource may be available in different sizes, such as large resources—consisting of many processors, large amounts of memory and/or large storage capacity—and small resources—consisting of fewer processors, smaller amounts of memory and/or smaller storage capacity. Customers may choose to allocate a number of small processing resources as web servers and/or one large processing resource as a database server, for example.

Data center 610 may include servers 616a-b (which may be referred herein singularly as server 616 or in the plural as servers 616) that provide computing resources. These resources may be available as bare metal resources, or as virtual machine instances 618a-d and (which may be referred herein singularly as virtual machine instance 618 or in the plural as virtual machine instances 618). Virtual machine instances 618c and 618d can be communication service virtual machine. The communication service virtual machine instances 618c and 618d may be configured to perform all or any portion of the communication services (e.g., contact center services, virtual environment services, determining virtual features, facilitating communication sessions, content services for accessing virtual environments) in accordance with the present disclosure and described in detail herein. As should be appreciated, while the particular example illustrated in FIG. 6 includes one communication service virtual machine in each server, this is merely an example. A server may include more than one communication service virtual machine or may not include any communication service virtual machines.

The availability of virtualization technologies for computing hardware has provided benefits for providing large scale computing resources for customers and allowing computing resources to be efficiently and securely shared between multiple customers. For example, virtualization technologies may allow a physical computing device to be shared among multiple users by providing each user with one or more virtual machine instances hosted by the physical computing device. A virtual machine instance may be a software emulation of a particular physical computing system that acts as a distinct logical computing system. Such a virtual machine instance provides isolation among multiple operating systems sharing a given physical computing resource. Furthermore, some virtualization technologies may provide virtual resources that span one or more physical resources, such as a single virtual machine instance with multiple virtual processors that spans multiple distinct physical computing systems.

A communications network 630 may, for example, be a publicly accessible network of linked networks and possibly operated by various distinct parties, such as the Internet. In other embodiments, the communications network 630 may be a private network, such as, a corporate or university network that is wholly or partially inaccessible to non-privileged users. In still other embodiments, the communications network 630 may include one or more private networks with access to and/or from the Internet.

The communication network 630 may provide access to computers 602. User computers 602 may be computers utilized by users 600 or other customers of data center 610. For instance, user computer 602a or 602b may be a server, a desktop or laptop personal computer, a tablet computer, a wireless telephone, a personal digital assistant (PDA), an e-book reader, a game console, a set-top box or any other computing device capable of accessing data center 610. User computer 602a or 602b may connect directly to the Internet (e.g., via a cable modem or a Digital Subscriber Line (DSL)). Although only two user computers 602a and 602b are depicted, it should be appreciated that there may be multiple user computers.

User computers 602 may also be utilized to configure aspects of the computing resources provided by data center 610. In this regard, data center 610 might provide a gateway or web interface through which aspects of its operation may be configured through the use of a web browser application program executing on user computer 602. Alternately, a stand-alone application program executing on user computer 602 might access an application programming interface (API) exposed by data center 610 for performing the configuration operations. Other mechanisms for configuring the operation of various web services available at data center 610 might also be utilized.

Servers 616 shown in FIG. 6 may be standard servers configured appropriately for providing the computing resources described above and may provide computing resources for executing one or more web services and/or applications. In one embodiment, the computing resources may be virtual machine instances 618. In the example of virtual machine instances, each of the servers 616 may be configured to execute an instance manager 620a or 620b (which may be referred herein singularly as instance manager 620 or in the plural as instance managers 620) capable of executing the virtual machine instances 618. The instance managers 620 may be a virtual machine monitor (VMM) or another type of program configured to enable the execution of virtual machine instances 618 on server 616, for example. As discussed above, each of the virtual machine instances 618 may be configured to execute all or a portion of an application.

It should be appreciated that although the embodiments disclosed above discuss the context of virtual machine instances, other types of implementations can be utilized with the concepts and technologies disclosed herein. For example, the embodiments disclosed herein might also be utilized with computing systems that do not utilize virtual machine instances.

In the example data center 610 shown in FIG. 6, a router 614 may be utilized to interconnect the servers 616a and 616b. Router 614 may also be connected to gateway 640, which is connected to communications network 630. Router 614 may be connected to one or more load balancers, and alone or in combination may manage communications within networks in data center 610, for example by forwarding packets or other data communications as appropriate based on characteristics of such communications (e.g., header information including source and/or destination addresses, protocol identifiers, size, processing requirements, etc.) and/or the characteristics of the private network (e.g., routes based on network topology, etc.). It will be appreciated that, for the sake of simplicity, various aspects of the computing systems and other devices of this example are illustrated without showing certain conventional details. Additional computing systems and other devices may be interconnected in other embodiments and may be interconnected in different ways.

In the example data center 610 shown in FIG. 6, a server manager 615 is also employed to at least in part direct various communications to, from and/or between servers 616a and 616b. While FIG. 6 depicts router 614 positioned between gateway 640) and server manager 615, this is merely an exemplary configuration. In some cases, for example, server manager 615 may be positioned between gateway 640 and router 614. Server manager 615 may, in some cases, examine portions of incoming communications from user computers 602 to determine one or more appropriate servers 616 to receive and/or process the incoming communications. Server manager 615 may determine appropriate servers to receive and/or process the incoming communications based on factors such as an identity, location or other attributes associated with user computers 602, a nature of a task with which the communications are associated, a priority of a task with which the communications are associated, a duration of a task with which the communications are associated, a size and/or estimated resource usage of a task with which the communications are associated and many other factors. Server manager 615 may, for example, collect or otherwise have access to state information and other information associated with various tasks in order to, for example, assist in managing communications and other operations associated with such tasks.

It should be appreciated that the network topology illustrated in FIG. 6 has been greatly simplified and that many more networks and networking devices may be utilized to interconnect the various computing systems disclosed herein. These network topologies and devices should be apparent to those skilled in the art.

It should also be appreciated that data center 610 described in FIG. 6 is merely illustrative and that other implementations might be utilized. Additionally, it should be appreciated that the functionality disclosed herein might be implemented in software, hardware or a combination of software and hardware. Other implementations should be apparent to those skilled in the art. It should also be appreciated that a server, gateway or other computing device may comprise any combination of hardware or software that can interact and perform the described types of functionality, including without limitation desktop or other computers, database servers, network storage devices and other network devices, PDAs, tablets, cellphones, wireless phones, pagers, electronic organizers, Internet appliances, television-based systems (e.g., using set top boxes and/or personal/digital video recorders) and various other consumer products that include appropriate communication capabilities. In addition, the functionality provided by the illustrated modules may in some embodiments be combined in fewer modules or distributed in additional modules. Similarly, in some embodiments the functionality of some of the illustrated modules may not be provided and/or other additional functionality may be available.

Figure 7:
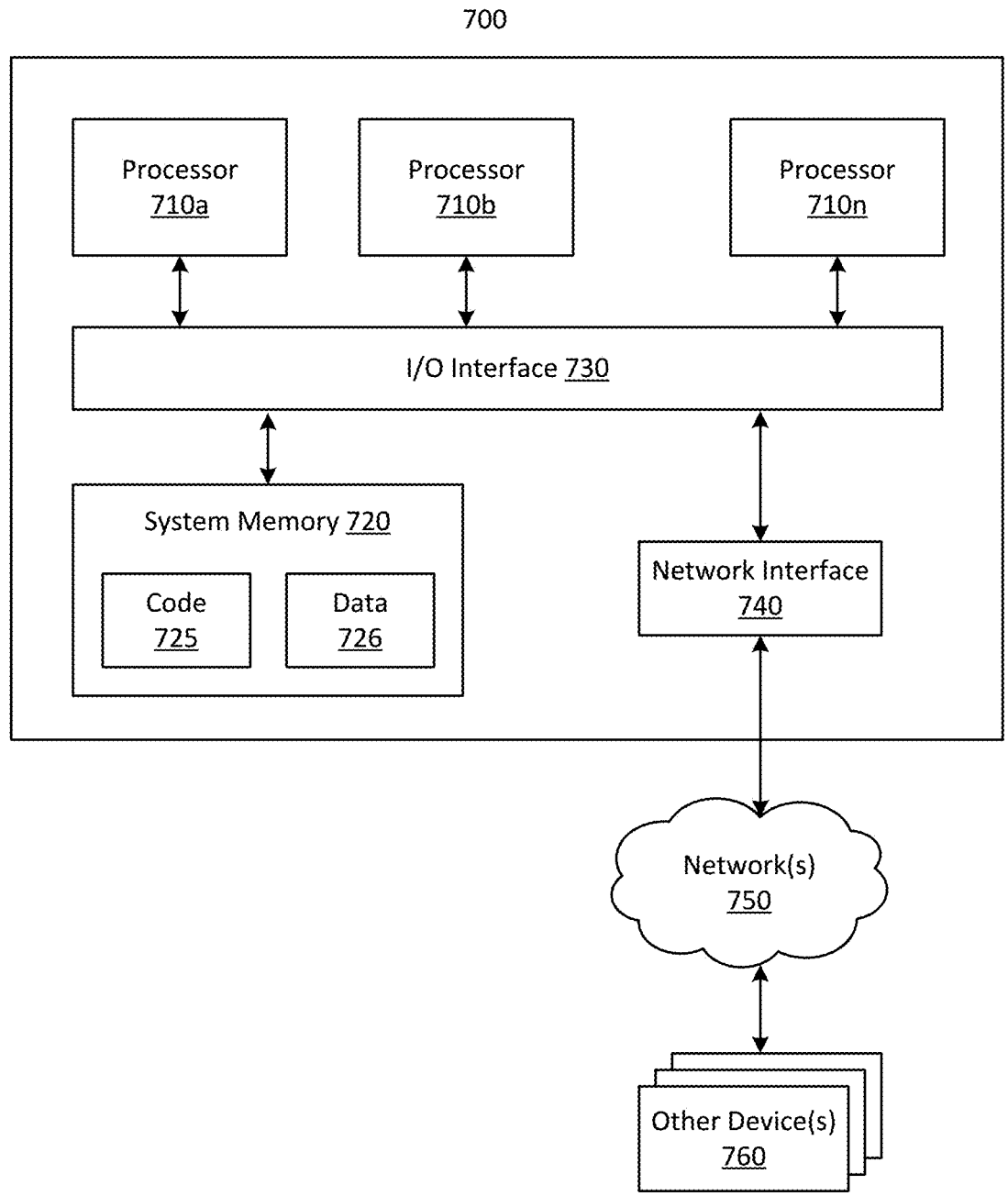
FIG. 7 is a diagram illustrating an example computing system that may be used in some embodiments.

In at least some embodiments, a server that implements a portion or all of one or more of the technologies described herein may include a general-purpose computer system that includes or is configured to access one or more computer-accessible media. FIG. 7 depicts a general-purpose computer system that includes or is configured to access one or more computer-accessible media. The example computer system of FIG. 7 may be configured to implement one or more of the services platform, such as the participant device 102, the media conferencing service 104, the media conferencing service 204, the organizer 214, and the participant nodes 212A-E. The general-purpose computer system of FIG. 7 may be configured to implement any of the methods described herein, such as any methods (e.g., or any operations) associated with FIGS. 3 and 5A-B.

In the illustrated embodiment, computing device 700 includes one or more processors 710a, 710b and/or 710n (which may be referred herein singularly as "a processor 710" or in the plural as "the processors 710") coupled to a system memory 720 via an input/output (I/O) interface 730. Computing device 710 further includes a network interface 740 coupled to I/O interface 730.

In various embodiments, computing device 700 may be a uniprocessor system including one processor 710 or a multiprocessor system including several processors 710 (e.g., two, four, eight or another suitable number). Processors 710 may be any suitable processors capable of executing instructions. For example, in various embodiments, processors 710 may be general-purpose or embedded processors implementing any of a variety of instruction set architectures (ISAs), such as the x86, PowerPC, SPARC or MIPS ISAs or any other suitable ISA. In multiprocessor systems, each of processors 710 may commonly, but not necessarily, implement the same ISA.

System memory 720 may be configured to store instructions and data accessible by processor(s) 710. In various embodiments, system memory 720 may be implemented using any suitable memory technology, such as static random access memory (SRAM), synchronous dynamic RAM (SDRAM), nonvolatile/Flash®-type memory or any other type of memory. In the illustrated embodiment, program instructions and data implementing one or more desired functions, such as those methods, techniques and data described above, are shown stored within system memory 720 as code 725 and data 726.

In an embodiment, I/O interface 730) may be configured to coordinate I/O traffic between processor 710, system memory 720) and any peripherals in the device, including network interface 740 or other peripheral interfaces. In some embodiments, I/O interface 730) may perform any necessary protocol, timing or other data transformations to convert data signals from one component (e.g., system memory 720) into a format suitable for use by another component (e.g., processor 710). In some embodiments, I/O interface 730 may include support for devices attached through various types of peripheral buses, such as a variant of the Peripheral Component Interconnect (PCI) bus standard or the Universal Serial Bus (USB) standard, for example. In some embodiments, the function of I/O interface 730) may be split into two or more separate components, such as a north bridge and a south bridge, for example. Also, in some embodiments some or all of the functionality of I/O interface 730, such as an interface to system memory 720, may be incorporated directly into processor 710.

Network interface 740 may be configured to allow data to be exchanged between computing device 700 and other device or devices 760 attached to a network or networks 750, such as other computer systems or devices, for example. In various embodiments, network interface 740) may support communication via any suitable wired or wireless general data networks, such as types of Ethernet networks, for example. Additionally, network interface 740 may support communication via telecommunications/telephony networks such as analog voice networks or digital fiber communications networks, via storage area networks such as Fiber Channel SANs (storage area networks) or via any other suitable type of network and/or protocol.

In some embodiments, system memory 720 may be a computer-accessible medium configured to store program instructions and data as described above for implementing embodiments of the corresponding methods and apparatus. However, in other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computing device 700 via I/O interface 730. A non-transitory computer-accessible storage medium may also include any volatile or non-volatile media such as RAM (e.g. SDRAM, DDR SDRAM, RDRAM, SRAM, etc.), ROM (read only memory) etc., that may be included in some embodiments of computing device 700 as system memory 720 or another type of memory.

Further, a computer-accessible medium may include transmission media or signals such as electrical, electromagnetic or digital signals conveyed via a communication medium such as a network and/or a wireless link, such as those that may be implemented via network interface 740. Portions or all of multiple computing devices such as those illustrated in FIG. 7 may be used to implement the described functionality in various embodiments: for example, software components running on a variety of different devices and servers may collaborate to provide the functionality. In some embodiments, portions of the described functionality may be implemented using storage devices, network devices or special-purpose computer systems, in addition to or instead of being implemented using general-purpose computer systems. The term "computing device," as used herein, refers to at least all these types of devices and is not limited to these types of devices.

A compute node, which may be referred to also as a computing node, may be implemented on a wide variety of computing environments, such as commodity-hardware computers, virtual machines, web services, computing clusters and computing appliances. Any of these computing devices or environments may, for convenience, be described as compute nodes.

A network set up by an entity such as a company or a public sector organization to provide one or more web services (such as various types of cloud-based computing or storage) accessible via the Internet and/or other networks to a distributed set of clients may be termed a provider network. Such a provider network may include numerous data centers hosting various resource pools, such as collections of physical and/or virtualized computer servers, storage devices, networking equipment, and the like, needed to implement and distribute the infrastructure and web services offered by the provider network. The resources may in some embodiments be offered to clients in various units related to the web service, such as an amount of storage for storage, processing capability for processing, as instances, as sets of related services and the like. A virtual computing instance may, for example, comprise one or more servers with a specified computational capacity (which may be specified by indicating the type and number of CPUs, the main memory size and so on) and a specified software stack (e.g., a particular version of an operating system, which may in turn run on top of a hypervisor).

A number of different types of computing devices may be used singly or in combination to implement the resources of the provider network in different embodiments, including general purpose or special purpose computer servers, storage devices, network devices and the like. In some embodiments a client or user may be provided direct access to a resource instance, e.g., by giving a user an administrator login and password. In other embodiments the provider network operator may allow clients to specify execution requirements for specified client applications and schedule execution of the applications on behalf of the client on execution platforms (such as application server instances, Java™ virtual machines (JVMs), general purpose or special-purpose operating systems, platforms that support various interpreted or compiled programming languages such as RUBY, PERL, PYTHON, C, C++ and the like or high-performance computing platforms) suitable for the applications, without, for example, requiring the client to access an instance or an execution platform directly. A given execution platform may utilize one or more resource instances in some implementations; in other implementations multiple execution platforms may be mapped to a single resource instance.

In many environments, operators of provider networks that implement different types of virtualized computing, storage and/or other network-accessible functionality may allow customers to reserve or purchase access to resources in various resource acquisition modes. The computing resource provider may provide facilities for customers to select and launch the desired computing resources, deploy application components to the computing resources and maintain an application executing in the environment. In addition, the computing resource provider may provide further facilities for the customer to quickly and easily scale up or scale down the numbers and types of resources allocated to the application, either manually or through automatic scaling, as demand for or capacity requirements of the application change. The computing resources provided by the computing resource provider may be made available in discrete units, which may be referred to as instances. An instance may represent a physical server hardware platform, a virtual machine instance executing on a server or some combination of the two. Various types and configurations of instances may be made available, including different sizes of resources executing different operating systems (OS) and/or hypervisors, and with various installed software applications, runtimes and the like. Instances may further be available in specific availability zones, representing a logical region, a fault tolerant region, a data center or other geographic location of the underlying computing hardware, for example. Instances may be copied within an availability zone or across availability zones to improve the redundancy of the instance, and instances may be migrated within a particular availability zone or across availability zones. As an example, the latency for client communications with a particular server in an availability zone may be less than the latency for client communications with a different server. As such, an instance may be migrated from the higher latency server to the lower latency server to improve the overall client experience.

In some embodiments the provider network may be organized into a plurality of geographical regions, and each region may include one or more availability zones. An availability zone (which may also be referred to as an availability container) in turn may comprise one or more distinct locations or data centers, configured in such a way that the resources in a given availability zone may be isolated or insulated from failures in other availability zones. That is, a failure in one availability zone may not be expected to result in a failure in any other availability zone. Thus, the availability profile of a resource instance is intended to be independent of the availability profile of a resource instance in a different availability zone. Clients may be able to protect their applications from failures at a single location by launching multiple application instances in respective availability zones. At the same time, in some implementations inexpensive and low latency network connectivity may be provided between resource instances that reside within the same geographical region (and network transmissions between resources of the same availability zone may be even faster).

Each of the processes, methods, and algorithms described in the preceding sections may be embodied in, and fully or partially automated by, code modules executed by one or more computers or computer processors. The code modules may be stored on any type of non-transitory computer-readable medium or computer storage device, such as hard drives, solid state memory, optical disc and/or the like. The processes and algorithms may be implemented partially or wholly in application-specific circuitry. The results of the disclosed processes and process steps may be stored, persistently or otherwise, in any type of non-transitory computer storage such as, e.g., volatile or non-volatile storage.

The various features and processes described above may be used independently of one another, or may be combined in various ways. All possible combinations and sub-combinations are intended to fall within the scope of this disclosure. In addition, certain methods or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel or in some other manner. Blocks or states may be added to or removed from the disclosed example embodiments. The example systems and components described herein may be configured differently than described. For example, elements may be added to, removed from or rearranged compared to the disclosed example embodiments.

It will also be appreciated that various items are illustrated as being stored in memory or on storage while being used, and that these items or portions thereof may be transferred between memory and other storage devices for purposes of memory management and data integrity. Alternatively, in other embodiments some or all of the software modules and/or systems may execute in memory on another device and communicate with the illustrated computing systems via inter-computer communication. Furthermore, in some embodiments, some or all of the systems and/or modules may be implemented or provided in other ways, such as at least partially in firmware and/or hardware, including, but not limited to, one or more application-specific integrated circuits (ASICs), standard integrated circuits, controllers (e.g., by executing appropriate instructions, and including microcontrollers and/or embedded controllers), field-programmable gate arrays (FPGAs), complex programmable logic devices (CPLDs), etc. Some or all of the modules, systems and data structures may also be stored (e.g., as software instructions or structured data) on a computer-readable medium, such as a hard disk, a memory, a network or a portable media article to be read by an appropriate drive or via an appropriate connection. The systems, modules and data structures may also be transmitted as generated data signals (e.g., as part of a carrier wave or other analog or digital propagated signal) on a variety of computer-readable transmission media, including wireless-based and wired/cable-based media, and may take a variety of forms (e.g., as part of a single or multiplexed analog signal, or as multiple discrete digital packets or frames). Such computer program products may also take other forms in other embodiments. Accordingly, the present invention may be practiced with other computer system configurations.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements, and/or steps. Thus, such conditional language is not generally intended to imply that features, elements and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations and so forth. Also, the term "or" is used in its inclusive sense (and not in its exclusive sense) so that when used, for example, to connect a list of elements, the term "or" means one, some or all of the elements in the list.

While certain example embodiments have been described, these embodiments have been presented by way of example only and are not intended to limit the scope of the inventions disclosed herein. Thus, nothing in the foregoing description is intended to imply that any particular feature, characteristic, step, module or block is necessary or indispensable. Indeed, the novel methods and systems described herein may be embodied in a variety of other forms: furthermore, various omissions, substitutions and changes in the form of the methods and systems described herein may be made without departing from the spirit of the inventions disclosed herein. The accompanying claims and their equivalents are intended to cover such forms or modifications as would fall within the scope and spirit of certain of the inventions disclosed herein.

What is claimed is:

1. A computer implemented method comprising:
    joining, by a client, a media conference hosted by one or more servers;
    receiving, by the client, from the one or more servers, an access token enabling access to a feature and indicating a first allotment associated with the feature, wherein the client provides the feature conditionally based on allotment non-exhaustion, wherein providing the feature conditionally includes continuing to provide the feature when the first allotment or a subsequent allotment are not exhausted or within a leniency period, and wherein the providing the feature conditionally further includes disabling the feature when the first allotment and all subsequent allotments are exhausted and a number of requests for additional allotment associated with the feature exceeds a maximum number of additional allotment requests associated with the feature;
    using, by the client, the feature during the media conference;
    decrementing, by the client, based on use of the feature during the media conference, the first allotment associated with the feature;
    determining, by the client, that an allotment refresh is needed;
    requesting, by the client, based on the access token, in response to the determination that the allotment refresh is needed, additional allotment associated with the feature; and
    receiving, by the client, the additional allotment associated with the feature.

2. The method of claim 1, wherein determining that the allotment refresh is needed comprises determining that the first allotment associated with the feature is within a threshold level of exhaustion.

3. The method of claim 1, wherein the access token further comprises at least one of a maximum allotment associated with the feature, the maximum number of additional allotment requests associated with the feature, or an allotment expiration.

4. The method of claim 3, further comprising:
    determining that an additional allotment refresh is needed;
    determining that total costs associated with the feature exceeds the maximum allotment associated with the feature; and
    disabling the use of the feature during the media conference.

5. The method of claim 1, further comprising:
    determining that an additional allotment refresh is needed;

determining that the number of requests for additional allotment associated with the feature exceeds the maximum number of additional allotment requests associated with the feature; and disabling the use of the feature during the media conference.

6. The method of claim 1, wherein decrementing the first allotment associated with the feature comprises decrementing the first allotment associated with the feature periodically at predetermined time intervals or based on discrete user action during the media conference.

7. The method of claim 1, further comprising continuing the use of the feature during the media conference for the leniency period following exhaustion of the first allotment associated with the feature.

8. The method of claim 1, wherein the feature is at least one of noise suppression, background blurring, feature extraction, encryption, color correction, audio or video encoding, running a video game, sound effects, visual effects, or augmented reality.

9. The method of claim 1, wherein the media conference is at least one of an audio conference, a video conference, a chat session, or a gaming session.

10. A media conferencing service comprising:

a computing node and a non-transitory computer-readable medium, the non-transitory computer-readable medium having stored therein computer-readable instructions upon execution by the computing node configure the media conferencing service to perform operations comprising:

receiving, from a participant, a first request to establish a media conference, the first request including an identifier of the participant;

authenticating the participant to establish the media conference;

forwarding, to the participant, an access token enabling access to a feature to be used during the media conference and indicating a first allotment associated with the feature, wherein the feature is executed by a client associated with the participant, wherein the client provides the feature conditionally based on allotment non-exhaustion, wherein providing the feature conditionally includes continuing to provide the feature when the first allotment or a subsequent allotment are not exhausted or within a leniency period, and wherein the providing the feature conditionally further includes disabling the feature when the first allotment and all subsequent allotments are exhausted and a number of requests for additional allotment associated with the feature exceeds a maximum number of additional allotment requests associated with the feature;

receiving, from the participant, a second request for additional allotment associated with the feature during the media conference, the second request comprising the access token;

authenticating the access token; and forwarding, in response to authentication of the access token, additional allotment associated with the feature.

11. The media conferencing service of claim 10, wherein the computer-readable instructions upon execution configures the media conferencing service to authenticate the access token by verifying a signature in the access token.

12. The media conferencing service of claim 10, wherein the computer-readable instructions upon execution configures the media conferencing service to forward the access token by forwarding the access token to an intermediary that is configured to forward the access token to the participant.

13. The media conferencing service of claim 10, wherein the computer-readable instructions upon execution configures the media conferencing service to authenticate the participant to establish the media conference by:

receiving a shadow object from the participant; and determining that the shadow object from the participant matches a corresponding shadow object maintained by the media conferencing service.

14. The media conferencing service of claim 10, wherein the feature is at least one noise suppression, background blurring, feature extraction, encryption, color correction, audio or video encoding, running a video game, sound effects, visual effects, or augmented reality.

15. The media conferencing service of claim 10, wherein the media conference is at least one of an audio conference, a video conference, a chat session, or a gaming session.

16. A non-transitory computer-readable storage medium having stored thereon computer-readable instructions, the computer-readable instructions comprising instructions that, upon execution on one or more computing devices, at least cause the one or more computing devices to:

join, by a client, a media conference hosted by one or more servers;

receive, by the client, from the one or more servers, an access token enabling access to a feature and indicating a first allotment associated with the feature, wherein the client provides the feature conditionally based on allotment non-exhaustion, wherein providing the feature conditionally includes continuing to provide the feature when the first allotment or a subsequent allotment are not exhausted or within a leniency period, and wherein the providing the feature conditionally further includes disabling the feature when the first allotment and all subsequent allotments are exhausted and a number of requests for additional allotment associated with the feature exceeds a maximum number of additional allotment requests associated with the feature;

activate, by the client, the feature during the media conference;

decrement, by the client, based on use of the feature during the media conference, the first allotment associated with the feature;

determine, by the client, that an allotment refresh is needed;

request, by the client, based on the access token, in response to a determination that the allotment refresh is needed, additional allotment associated with the feature; and receive, by the client, the additional allotment associated with the feature.

17. The non-transitory computer-readable storage medium of claim 16, wherein the instructions, upon execution on the one or more computing devices, cause decrementing the first allotment associated with the feature by decrementing the first allotment associated with the feature periodically at predetermined time intervals or based on discrete user action during the media conference.

18. The non-transitory computer-readable storage medium of claim 16, wherein the feature is at least one of noise suppression, background blurring, feature extraction, encryption, color correction, audio or video encoding, running a video game, sound effects, visual effects, or augmented reality.

19. The non-transitory computer-readable storage medium of claim 16, wherein the media conference is at least one of an audio conference, a video conference, a chat session, or a gaming session.

20. The non-transitory computer-readable storage medium of claim 16, wherein the access token further comprises at least one of a maximum allotment associated with the feature, the maximum number of additional allotment requests associated with the feature, or an allotment expiration.

\* \* \* \* \*